No. 759,455. PATENTED MAY 10, 1904.
A. H. MARKS.
RUBBER TIRED WHEEL.
APPLICATION FILED SEPT. 23, 1903.
NO MODEL.
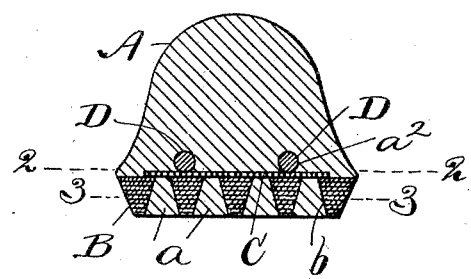
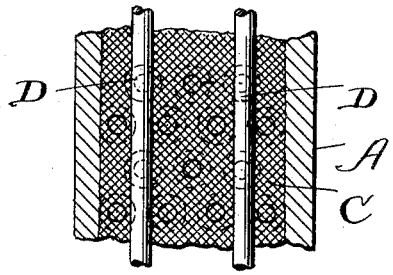
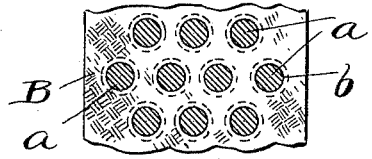
Witnesses.
E. B. Gilchrist
N. L. Brennan
Inventor.
Arthur H. Marks
By his attorneys
Thurston & Bates No. 759,455. Patented May 10, 1904.

UNITED STATES PATENT OFFICE.

ARTHUR H. MARKS, OF AKRON, OHIO.

RUBBER-TIRED WHEEL.

SPECIFICATION forming part of Letters Patent No. 759,455, dated May 10, 1904.

Application filed September 23, 1903. Serial No. 174,253. (No model.)

*To all whom it may concern:*

Be it known that I, ARTHUR H. MARKS, a citizen of the United States, residing at Akron, in the county of Summit and State of Ohio, have invented a certain new and useful Improvement in Rubber Wheel-Tires, of which the following is a full, clear, and exact description, reference being had to the accompanying drawings.

The object of the invention is to provide a strong and durable rubber tire for vehicle-wheels.

The invention may be said to consist in the construction and combinations of parts hereinafter described, and pointed out definitely in the claims.

In the drawings, Figure 1 is a transverse sectional view of a tire embodying the invention. Fig. 2 is a sectional plan on the line 2 2 of Fig. 1. Fig. 3 is a sectional plan on line 3 3 of Fig. 1.

The tire, as shown, is in its transverse sectional configuration of familiar form, being adapted for use upon the ordinary flanged wheel-rim, upon which it is fastened by two wire rings D, which extend through the tire lengthwise. This is a very common way of securing tires of this shape upon the rims referred to. These wires, however, with tires as ordinarily constructed cut and wear and tear the tire, sometimes cutting entirely through the base of the tire. More frequently, however, the holes through which the wires pass are so enlarged by use that the tire slips from the wheel-rim. In order to prevent this action, the tire shown has a relatively stiff tough base portion B, which is made of a plurality of layers of canvas "friction," so called, while the tread A is made of some suitable resilient rubber compound. The base and the tread portions are securely fastened together, preferably by the interlocking of the projections or dovetailed tongues $a$, which are homogeneous parts of the tread portion, with undercut holes $b$ in the base portion. These interlocking tongues and holes prevent the tread portion of the tire from being pulled from the base, and it also prevents the different layers of the base from being pulled apart.

Resting upon the base, but wholly embedded in the tread portion of the tire, is a strip C, of woven-wire fabric, and the tread portion of the tire is by pressure before it is vulcanized caused to flow through and fill the holes between the wires of this fabric. The holes $a^2$, through which the fastening-wires D extend, are so located that the wires passing through them will bear upon this woven-wire strip, which strip will take substantially all of the wear of the wires incident to use.

Having described my invention, I claim—

1. A wheel-tire having a relatively tough stiff base portion, and a tread portion secured thereto and composed of resilient rubber compound, and a strip of woven-wire fabric embedded in the tread portion and close to the base portion, combined with wire-fastening devices which engage with said wire-fabric strip.

2. A wheel-tire having a relatively tough stiff base portion, and a tread portion secured thereto and composed of resilient rubber compound, and having two longitudinal fastening-wire holes, and a strip of woven-wire fabric embedded in the tread portion close to the inner edges of said fastening-holes and between them and the base portion.

3. A wheel-tire having a base portion composed of a plurality of layers of friction, and a tread portion formed of vulcanized rubber which has interlocking connections with said base portion, there being through the tread portion of the tire two longitudinal holes for the passage of the fastening-wires, a strip of woven-wire fabric embedded in the said portion of the tire resting upon the base thereof, and lying between said base and said wire-holes.

In testimony whereof I hereunto affix my signature in the presence of two witnesses.

ARTHUR H. MARKS.

Witnesses:
A. H. NOAH,
D. GALEHOUSE.